(12) United States Patent
Welc et al.

(10) Patent No.: US 8,195,898 B2
(45) Date of Patent: Jun. 5, 2012

(54) HYBRID TRANSACTIONS FOR LOW-OVERHEAD SPECULATIVE PARALLELIZATION

(75) Inventors: Adam Welc, Mountain View, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 11/965,120

(22) Filed: Dec. 27, 2007

(65) Prior Publication Data

US 2009/0172303 A1 Jul. 2, 2009

(51) Int. Cl.
*G06F 13/14* (2006.01)
(52) U.S. Cl. .................. 711/154; 711/156; 711/163
(58) Field of Classification Search .................. None
See application file for complete search history.

(56) References Cited

U.S. PATENT DOCUMENTS

| | | | |
|---|---|---|---|
| 2003/0182465 A1* | 9/2003 | Moir et al. | 709/314 |
| 2007/0239915 A1* | 10/2007 | Saha et al. | 710/200 |
| 2007/0282838 A1* | 12/2007 | Shavit et al. | 707/8 |
| 2008/0163220 A1* | 7/2008 | Wang et al. | 718/101 |
| 2008/0270745 A1* | 10/2008 | Saha et al. | 712/1 |
| 2009/0006767 A1* | 1/2009 | Saha et al. | 711/145 |

\* cited by examiner

*Primary Examiner* — Than Nguyen
(74) *Attorney, Agent, or Firm* — Trop, Pruner & Hu, P.C.

(57) ABSTRACT

A method and apparatus for a hybrid transactional memory system is herein described. A first transaction is executed utilizing a first style of a transactional memory system and a second transaction is executed in parallel utilizing a second style of a transactional memory system. For example, a main thread is executed utilizing an update-in place Software Transactional Memory (STM) system while a parallel thread, such as a helper thread, is executed utilizing a write buffering STM. As a result, a main thread may directly update memory locations, while a helper thread's transactional writes are buffered to ensure they do not invalidate transactional reads of the main thread. Therefore, parallel execution of threads is achieved, while ensuring at least one thread, such as a main thread, does not degrade below an amount of execution cycles it would take to execute the main thread serially.

15 Claims, 3 Drawing Sheets

HYBRID TRANSACTIONS FOR LOW-OVERHEAD SPECULATIVE PARALLELIZATION

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. One type of transactional execution includes a Software Transactional Memory (STM), where accesses are tracked, conflicts resolved, transactions aborted, and other transactional tasks are performed in software.

A single sequential application is executed within a single (main) thread of execution. Often, a sequential application can be compiled into different portions that may be executed by different threads independently from the main thread and in parallel to the main thread. In some implementations, these threads that assist execution of a main thread are often referred to as helper threads. However, during parallel execution of sequential applications, utilizing a single style transactional memory system, as commonly implemented in current computer systems, to execute both the main thread and helper thread may potentially result in degrading performance below a level of executing the original application in one thread sequentially.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware/software support for transactional execution, specific shared memory access tracking, specific locking/versioning/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, transaction hardware, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values. In addition, the terms reset and set, in one embodiment, refer to a default and an updated value or state, respectively. For example, a default value potentially includes a high logical value, i.e. reset, while an updated value potentially includes a low logical value, i.e. set.

The method and apparatus described herein are for executing threads utilizing different implementations of a Transactional Memory (TM) system. Specifically, execution of parallel threads utilizing different Software Transactional Memory (STM) systems is primarily discussed in reference to STM systems utilizing cache line based conflict detection. However, the methods and apparatus for implementing a Hybrid STM are not so limited, as they may be implemented on or in association with any transactional memory system.

Figure 1:
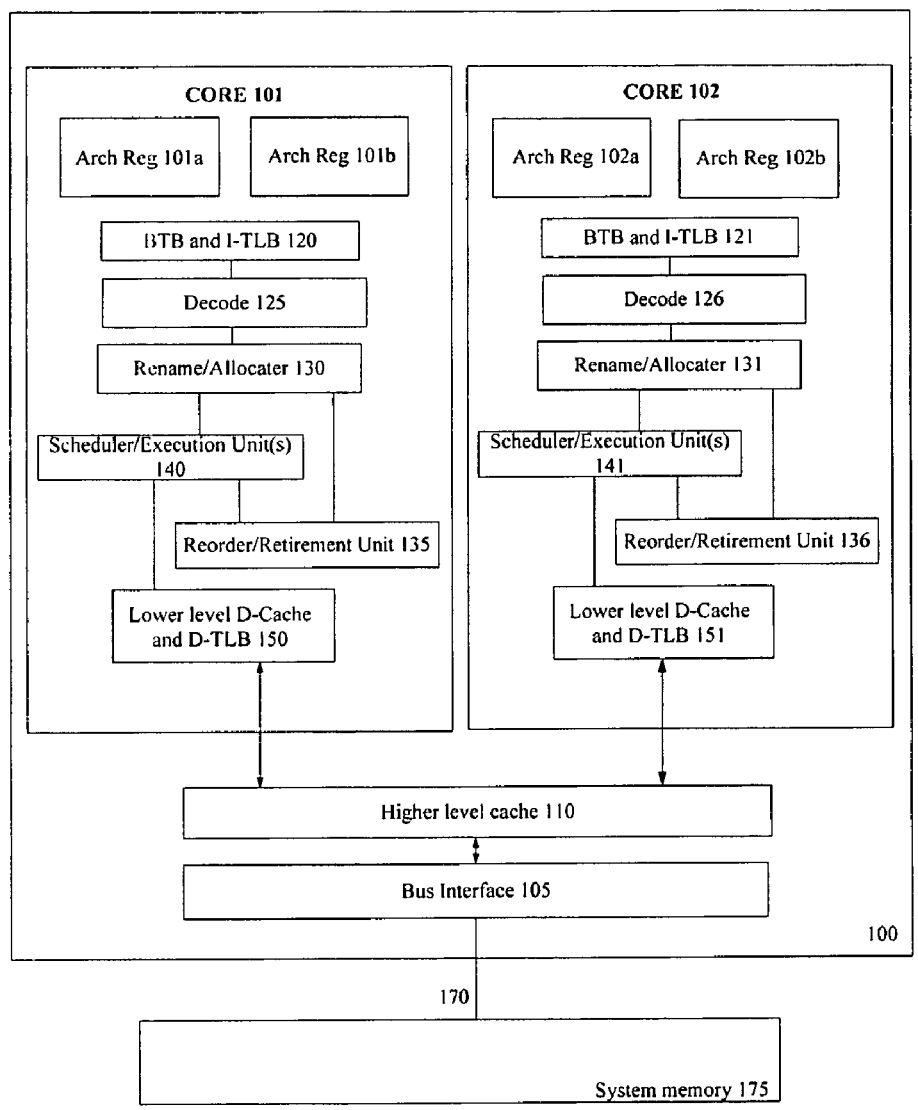
FIG. 1 illustrates an embodiment a system capable of implementing a hybrid transactional memory system.

Referring to FIG. 1, an embodiment of a multi-processing element processor capable of implementing a hybrid transactional memory (TM) system is illustrated. A processing element refers to a thread, a process, a context, a logical processor, a hardware thread, a core, and/or any processing element, which utilizes resources of the processor, such as reservation units, execution units, pipelines, and/or higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. Physical processor 100, as illustrated in FIG. 1, includes two cores, core 101 and 102, which share access to higher level cache 110. In addition, core 101 includes two hardware threads 101a and 101b, while core 102 includes two hardware threads 102a and 102b. Therefore, software entities, such as an operating system, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources.

In one embodiment, processor 100 is a multi-core processor capable of executing multiple threads in parallel. Here, a first thread is associated with architecture state registers 101a, a second thread is associated with architecture state registers 101b, a third thread is associated with architecture state registers 102a, and a fourth thread is associated with architecture state registers 102b. Reference to processing elements in processor 100, in one embodiment, includes reference to cores 101 and 102, as well as threads 101a, 101b, 102a, and 102b. In another embodiment, a processing element refers to elements at the same level in a hierarchy of processing domain. For example, core 101 and 102 are in the same domain level, and threads 101a, 101b, 102a, and 102b are in the same domain level, as they are all included within a core's domain.

Although processor 100 may include asymmetric cores, i.e. cores with different configurations, functional units, and/or logic, symmetric cores are illustrated. As a result, core 102, which is illustrated as identical to core 101, will not be discussed in detail to avoid obscuring the discussion.

As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage.

Typically bus interface unit 105 includes input/output (I/O) buffers to transmit and receive bus signals on interconnect 170. Examples of interconnect 170 include a Gunning Transceiver Logic (GTL) bus, a GTL+bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode traces. Module 120 also potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. As a specific example, a processor may include a page table structure to break physical memory into a plurality of virtual pages. Data cache 150 may be utilized as a transactional memory or other memory to track tentative accesses during execution of a transaction, as discussed in more detail below. Furthermore, when tracking tentative accesses utilizing a STM system, software tables/data may be held in system memory 175 and cached in lower level cache 150.

A transaction, which may also be referred to as a critical section of code, includes a grouping of instructions, operations, or micro-operations, which may be grouped by hardware, software, firmware, or a combination thereof. For example, instructions or operations may be used to demarcate a transaction or a critical section. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible.

However, if the transaction is invalidated during its pendancy, the transaction is restarted without making the updates globally visible. As a result, pendancy of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination thereof.

A Hardware Transactional Memory (HTM) system often refers to tracking access during execution of a transaction with processor 100 in hardware of processor 100. For example, cache 150 is to cache a data item/object from system memory 175. During execution of a transaction, an annotation/attribute field is associated with a cache line in cache 150, which is to hold the data object. The annotation field is utilized to track accesses to and from the cache line. In one embodiment, the annotation field includes a read storage cell and a write storage cell. Each of the storage cells is set upon the corresponding read or write to indicate if a read or write has occurred during a pendancy of a transaction. As a result, if a write to a cache line that has its read bit set to indicate a load has occurred, then a conflict is detected, as a line loaded from has been written to during a pendancy of a transaction. In other words, the data loaded by a pending transaction has been modified and is now invalid.

One type of transactional execution, includes A Software Transactional Memory (STM) system, which often refers to performing access tracking, conflict resolution, or other transactional memory tasks in or at least partially in software. As a general example, a compiler, when executed, compiles program code to insert read and write barriers for load and store operations, accordingly. A compiler may also insert other transaction and non-transaction related operations, such as commit operations, abort operations, bookkeeping operations, conflict detection operations, and strong atomicity operations.

Usually, a compiler inserts operations at transactional memory accesses/operations, as well as potentially at non-transactional operations, to ensure proper tracking, validation, and conflict detection. Note that the use of terms "at a transactional memory access," may refer to many locations within a transaction. For example, inserting an operation "at a transactional write," may refer to inserting the operation before the write operation, after the write operation, or at the end of the transaction including the write operation, such as an operation during commit to acquire a lock and/or copy a buffered value into a memory location at commit. Also note, that inserted operations may refer to any instruction, set of operations, operation, memory access, function, function call, or other executable software construct.

In one embodiment, processor 100 is capable of executing multiple transactions in parallel utilizing a hybrid Software Transactional Memory (STM) system. As an example, a first transaction is executed on core 101 utilizing an update-in place STM, i.e. transactional writes update memory locations, while a second transaction is executed on core 102 utilizing a write-buffering STM, i.e. transactional writes are buffered and written to memory upon commit. In one embodiment, the first transaction is included in a main portion of code, such as a main software thread, and the second transaction is included in a helper portion of code, such as a helper thread. As a result, the first transaction may be executed non-speculatively with updates being made to memory, while the second transaction may be executed speculatively. Here, the forward progress of the main thread is not impeded by the helper thread. More detail of hybrid transactional memory systems, and specifically, write-buffering and update-in place STMs will be discussed below.

Figure 2:
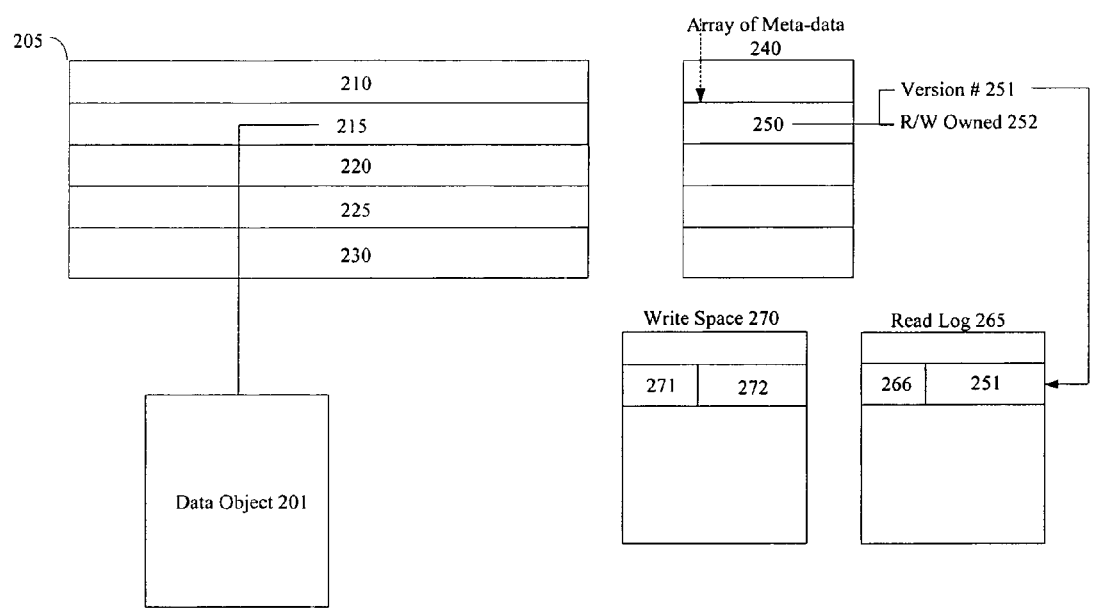
FIG. 2 illustrates an embodiment of a Software Transactional Memory (STM) system.

Referring to FIG. 2, a simplified illustrative embodiment of a STM system is depicted. Data object 201 includes any granularity of data, such as a word, a data element/operand, an instruction, a line of memory, a cache line, a programming language defined object, a field of a programming language defined object, and a table. Memory 205 may include any memory device, such as a cache, system memory, or group of registers.

In one embodiment, memory 205 is a low-level data cache. For example, in FIG. 1, cache 205 may be similar to low level data caches 150 and 151 for cores 101 and 102, respectively. As a result, in this embodiment, use of the term cache line conflict detection refers to detecting transactional conflicts on a low-level cache line or data object within a low-level cache line, granularity. Alternatively, cache 205 may include a higher level cache, such as cache 110 for FIG. 1. Note that read log 265 and write space 270 may be a data object, such as data object 201, which is to be held in a system memory and cached in cache 205, as well as other storage space, which is described below. However, often they are part of internal (run-time system) meta data that is distinct from user-level objects.

In one embodiment, a write to data object 201 updates cache line 215 with a new value, and old value 272 is held corresponding to address 271 in write space 270. Here, address 271 includes any representation of an address associated with line 215 and/or data object 201, such as a virtual address, linear address, physical address, or portion thereof. Upon committing the transaction, the old values in write log 270, such as value 272, are discarded and the tentative values held in line 215 are made globally visible, and conversely, upon aborting the transaction, the old values, such as value 272, are restored to the original locations, such as line 215, overwriting the tentatively held values.

Often, this type of software transactional memory (STM) system is referred to as a write log STM or an in-place update STM, as write space 270 resembles a write log to hold old values, while tentative transaction values are "updated in-place" within cache 205. In one embodiment of an update-in-place STM, where a main thread is executed utilizing an update-in place STM, the writes update memory, as described above, and are tracked as described below. However, reads are not logged, roll-back info is not logged, validation is not performed, and the transaction is not aborted.

In another embodiment, a write to data object 201 is buffered in write space 270, which resembles a write buffer, while old values remain in their original locations. Here, write buffer 270 holds tentative transaction value 272 to be written to location 215. Upon aborting the transaction, the tentative values held in write buffer 270 are discarded, and conversely, upon committing the transaction, the tentative values, such as value 272, are copied to the corresponding memory locations overwriting the old values. Often, this type of software transactional memory (STM) system is referred to as a write buffering STM, as write space 270 resembles a write buffer with tentative transaction values being buffered/held in write space 270.

Note, that write space 270 may include any storage area. In one embodiment, write space 270 is a higher level memory, such as a second level cache or system memory. In another embodiment, write space 270 may be a separate write space held in registers or other locations of memory. Write space 270 may resemble a lookup table with an address associated with a corresponding value. In yet another embodiment, write space 270 may include a program stack, separate stack, or other software controlled structure held in any of the aforementioned storage areas or a separate storage area.

In one embodiment, tracking of transactional writes includes utilizing transaction records/locks. In one embodiment, transaction record/lock 250 is associated with a memory location, such as line 215 and/or data object 201, i.e. a system memory location. Transaction record 250 is acquired before updating cache line 215 and released after the update, which may be either immediately after the update or at commit of the transaction.

For example, in an in-place update STM, transaction record 250 may be acquired before a write is executed to update line 215 and immediately released after the update is complete. As another example, in a write-buffering STM transaction record 250 may be acquired after the tentative value to be written to line 215 is buffered in write space 270 at commit of the transaction and released after the update is performed upon commit. In one embodiment, releasing transaction record/lock 250 includes returning meta-data location 250 to a value that represents an unlocked or un-owned state. As an example, the value is incremented from a previous value to represent a new unlocked version value 251.

To illustrate, assume meta-data location 250 holds a version value of two initially to indicate that line 215 is unlocked/un-owned. When a write is encountered, meta-data location is updated to owned value 252 of three. Note owned value 252 may include any value, such as a value to represent which processing element owns the location, i.e. a processing element identifier value, or simply any owned value. Furthermore, bit positions within meta-data location 250 may be utilized to indicate an owned or un-owned state. For example, a Most-Significant-Bit (MSB) position within a group of storage cells to hold information for meta-data location 250 may be set or reset to indicate an owned or un-owned state. To illustrate, if the MSB storage cell holds a logical one, then meta-data location 250 indicates that line 215 is owned, and in contrast, if the MSB storage cell holds a logical zero, location 250 is un-owned.

After an update to line 215, transaction record 250 is released. In one embodiment, an incremented version of the previous value of two, such as a value of four, is written back to location 250 to indicate both that line 215 is un-owned and that line 215 has been updated, i.e. location 250 has updated from a version of two to a version of four. This versioning allows for transactions to validate their reads that loaded data object 201 by comparing their logged version values in their read logs to current version value 251.

The example above includes one embodiment of implementing an STM; however, any known implementation of an STM may be used. In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system. For example, HTM features, such as annotation bits, may be utilized to accelerate an STM, such as being set/reset based on accesses to the cache line, which software may interpret and utilize to accelerate transactional tracking/conflict detection on a cache line level.

As stated above, a compiler, when executed, to compile program or application code, may insert operations and modules in application code; the operations and modules, when executed, to implement hybrid STMs. Operations may include functions, calls to functions, groups of operations/instructions, loops, conditional statements, and other executable code to perform the operations described.

In one embodiment, a compiler is capable of parallelizing application code. Although parallelizing of code is well-known, any number of parallel sections of code may be inserted by a compiler. As an example, an independent portion of code, i.e. a portion of code that operates over disjointed data sets and does not rely on computation of a main portion of code, may be formed into a parallel section of code. Here, a compiler may insert operations to spawn a thread to execute the independent portion of code. Often, a software thread to execute a parallel section of code from a main thread/section of code or to aid execute of a main/thread, is referred to as a helper thread or helper section of code.

Although, helper threads have been discussed in reference to executing sections of application code, a compiler may insert modules separate from the application code to aid in the execution of a main thread. A few examples of helper modules, include a spin lock module to perform a task while a main thread is waiting for a lock to be released by another thread, a future lock acquire module to acquire future locks for future writes, a run-ahead module to execute code or branches that may potentially be executed in the future.

In one embodiment, a main thread or main section of code is executed utilizing an update-in place STM implementation. As an example, operations are inserted by a compiler in a main section of code, when executed, to perform update-in place STM tasks. In one example, a transaction in the main section of code performs the in-place memory updates and does not log or validate a read set. Here, a second transaction in a second section of code, such as a helper section of code, is executed utilizing a write-buffering STM. The second transaction tracks reads, tracks writes, and performs validation. If a write occurs to a memory location loaded by the second transaction during a pendancy of the second transaction, then the second transaction is potentially aborted. The helper thread is executed in parallel with the main thread. If a conflict between the main thread and helper thread occur, then main thread is allowed to continue.

Note that the above discussion has been in reference to execution of a main thread and another parallel section of code, such as a helper thread. However, utilizing a hybrid transactional memory system is not so limited. For example, any two transactions, whether serially executed or executed in parallel, may utilize different transactional memory implementations.

Figure 3:
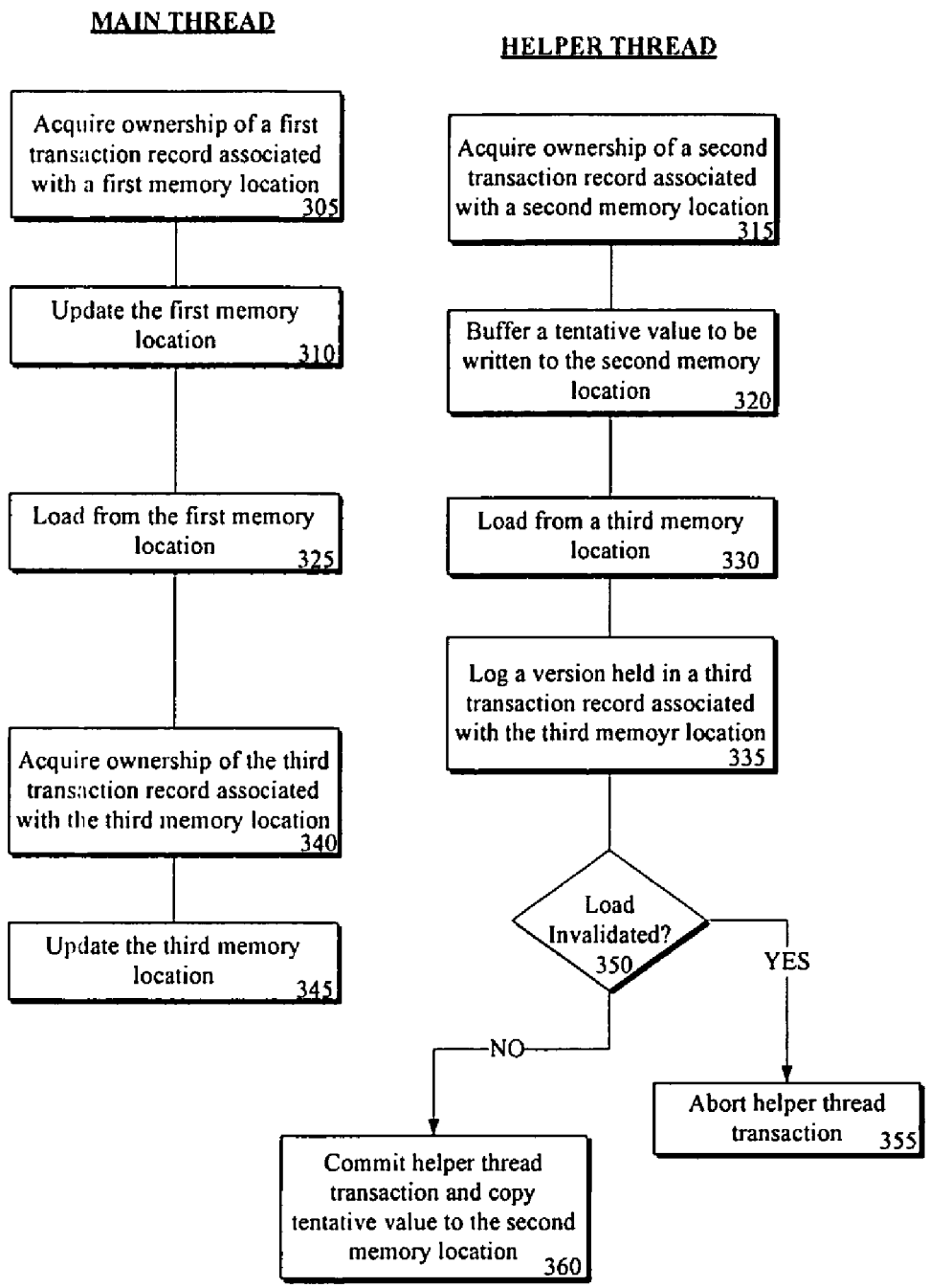
FIG. 3 illustrates an embodiment of a flow diagram for a method of executing parallel transactions utilizing different STMs.

Referring to FIG. 3, an embodiment of a flow diagram for a method of executing two software threads utilizing a hybrid transactional memory system is illustrated. Although the flow in FIG. 3 is depicted as substantially serial within each of the threads, any of the flows may take place in any order, as well as in parallel. For example, acquiring ownership in flow 315 may occur in any order, such as at flow 360, when the helper transaction is committed. In that case, transaction records are acquired at commit, the memory locations are updated, and the transaction records are released, instead of holding the transaction record for the entire transaction. As noted above, program code, when executed, to analyze/compile application code inserts operations, when executed, to perform the flows, methods, and operations discussed below.

As illustrated, a main thread is being executed in parallel with a helper thread. Although, not specifically illustrated, in one embodiment flows 305, 310, 325, 340, and 345 are during execution of a first transaction in the main thread and flows 315, 320, 330, 335, 350, 355, and 360 are during execution of a section transaction in the helper thread. As an example, a main portion of a sequential application is being executed on one processing element, while a second portion of the application, which may include a compiler inserted helper module and/or future operations/branches from the application, is being executed on a second processing element. Note from above any processing element, such as a core or hardware thread may be executing the software threads.

In flow 305, ownership of a first transaction record associated with a first memory location is acquired. In one embodiment, associating a transaction record with a memory location includes hashing at least a portion of an address associated with the memory location, such as a cache line, to index into a table of transaction records/locks. As an example, a value from the first transaction record is read and/or compared to determine if the transaction record is owned. In one embodiment, a storage cell, such as the MSB, is tested to determine if the transaction record is in an owned state. Here, a spin-lock event, such as waiting for the transaction record to become available, may result in spawning of the helper thread. If the first transaction record is available, then the first transaction record is updated to indicate the first transaction record is owned.

The first memory location is updated with a value in response to executing a write/store operation. Above, the operations/function to acquire ownership of the first transaction record may be inserted by a compiler at the write operation to track the transactional write. Although not illustrated, the transaction record may be released immediately after updating the first memory location in flow 310.

In parallel at flow 315, ownership of a second transaction record associated with a second memory location is acquired before a write operation within the helper thread transaction. However, in contrast to the main thread, a tentative value to be written to the second memory location is buffered in flow 320 instead of directly updating the second memory location.

In flow 325, a transactional read is executed in the main thread causing a load from the first memory location. In one embodiment, the transactional read is not logged for later load/version validation. Here, although writes are tracked utilizing locks/transaction records, reads are not tracked, as the main thread is not to be aborted in response to conflicts with the helper thread to ensure priority for the main thread. As a result, execution of the main thread does not degrade below serial execution of the application code, and potentially results in faster execution through parallel execution of a helper or second thread.

In contrast to the main thread in this embodiment, the helper thread executing a transactional read, loads from a third memory location in flow 330, and tracks the read in flow 335. In one embodiment, a version number held in a third transaction record associated with the third memory location is logged. Conflict detection on a cache line basis is performed for the helper thread to ensure valid data operations.

In one embodiment, on demand validation is performed to determine if a load from the helper thread is invalidated. Here, during execution of the helper thread on demand validation tools, such as timestamps, may be utilized to detect a conflict before attempting commit of a transaction in the helper thread. In another embodiment, as illustrated in FIG. 3, validation is performed at commit to validate a helper thread transaction's read set.

Here, the transaction in the main thread acquires ownership of the third transaction record associated with the third memory location in flow 340 and updates the third memory location in flow 345. Consequently, the load from the third memory location by the transaction in the helper thread has now been invalidated, as the current version held in the transaction record is different then the logged version from flow 335. In other words, the data loaded at flow 330 is now invalid, because the main thread has updated the third memory location while the helper thread transaction is still pending.

Therefore, at flow 350 it is determined whether a read set for the helper thread transaction has been invalidated. In one embodiment, as described above, logged version values are compared against current version values to determine if any of the loads in the transaction have been invalidated. As in the illustration, if a load is invalid, then the transaction is aborted. However, if no loads are invalid, then tentative values, such as the tentative value buffered in flow 320, are copied to corresponding memory locations in flow 360. As noted above, transaction records may be acquired immediately before copying in flow 360 and released after, instead of acquiring in flow 315.

Even though the discussion of a hybrid transactional memory system has been in reference to execution of transactions in main and helper threads utilizing STMs, a hybrid transactional memory system is not so limited. For example, any combination of transactional memory systems may be utilized, such as a hardware accelerated STM with a traditional STM. As an example, one transaction is executed utilizing annotation bits associated with each cache line to indicate reads and/or writes from cache lines to accelerate an STM, i.e. hardware acceleration. Here, another transaction may be executed utilizing a different hardware accelerated STM or a traditional non-accelerated STM. In addition, any two transactions may be executed utilizing hybrid transactional memory systems. For example, one processing element may execute a first transaction utilizing an update-in place STM, and a second processing element may execute a second unrelated transaction utilizing a write-buffering STM.

As can be seen from above, a hybrid transactional memory system enables one section of code to be executed to obtain benefits of one style of a transactional memory system while another section of code is able to be executed to obtain benefits of another style of a transactional memory system. For example, executing a main section of code utilizing an update-in place STM allows the main section to update memory directly. Furthermore, in one embodiment, during execution of transactions in the main section, reads are not tracked and information to abort transactions is not retained.

As a result, interference by another thread is not allowed to degrade or substantially adversely affect execution of the main section. Yet, another parallel section of code, such as a helper module, may be executed utilizing a different style of transactional memory system, such as a write-buffering STM, to ensure the main section of code receives adequate priority, i.e. writes a buffered to ensure updates to memory do not invalidate transactional loads in the main section. However, the parallel section of code may execute in parallel to aid the main section of code or execute unrelated code to efficiently utilize execution resources.

The embodiments of methods, software, firmware or code set forth above may be implemented via instructions or code stored on a machine-accessible or machine readable storage medium which are executable by a processing element. A machine-accessible/readable storage medium includes any mechanism that provides (i.e., stores and/or transmits) information in a form readable by a machine, such as a computer or electronic system. For example, a machine-accessible storage medium includes random-access memory (RAM), such as static RAM (SRAM) or dynamic RAM (DRAM); read-only memory (ROM); magnetic or optical storage medium; and flash memory device.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A machine readable storage medium including compiler code which, when executed by a machine, causes the machine to perform the operations of:
    inserting update-in-place write barrier software transactional memory (STM) operations at a first transactional write within a first transaction of a main portion of application code, wherein the update-in-place write barrier operations, when executed, are to cause the machine to update-in-place a first memory location referenced by the first transactional write; and
    inserting write buffering software transactional memory (STM) barrier operations at a second transactional write within a second transaction of a second portion of code of the application code, wherein the write buffering barrier operations, when executed, are to cause the machine to buffer the second transactional write to a second memory location referenced by the second transactional write.

2. The machine readable storage medium of claim 1, wherein the update-in-place write barrier operations, when executed are further to provide tracking of the first transactional write to the first memory location and the write buffering barrier operations, when executed are further to provide tracking of the second transactional write to the second memory location, and wherein tracking of the first transactional write to a first memory location comprises acquiring a first transaction record associated with the first memory location, and wherein tracking of the second transactional write to a second memory location comprises acquiring a second transaction record associated with the second memory location.

3. The machine readable storage medium of claim 2, wherein the compiler code which, when execute by the machine, further causes the machine to perform the operations of: inserting a set of read barrier operations at a second transactional read from the second memory location within the second transaction, wherein the second set of read barrier operations, when executed, are to track the second transactional read from the second memory location.

4. The machine readable storage medium of claim 3, wherein the set of read barrier operations, when executed, are to track the transactional read from the second memory location comprises logging a version held in the second transaction record associated with the second memory location.

5. The machine readable storage medium of claim 1, wherein the compiler code which, when execute by the machine, further causes the machine to separate the application code into the main portion and the second portion, wherein the helper portion of code is determined to take less execution cycles than the main portion.

6. A method comprising:
    logging a previous value from a first memory location and updating the first memory location in response to executing a first write operation in a first transaction within a main software thread;
    buffering a tentative value to be written to a second memory location in response to executing a second write operation in a second transaction within a speculative helper software thread;
    copying the tentative value to the second memory location in response to committing the second transaction.

7. The method of claim 6, further comprising acquiring a first transaction record associated with the first memory location before updating the first memory location.

8. The method of claim 7, further comprising acquiring a second transaction record associated with the second memory location before copying the tentative value to the second memory location.

9. The method of claim 8, further comprising loading a value from a third memory location in response to executing a load in the second transaction and logging a version value held in a third transaction record associated with the third memory location.

10. The method of claim 9, further comprising validating the second transaction and aborting the second transaction in response to determining the third memory location has been updated after executing the load in the second transaction.

11. The method of claim 10, wherein the first transaction is not validated and is not aborted.

12. A machine accessible storage medium including program code which, when executed by a machine, causes the machine to perform the operations of:
    updating a first plurality of memory locations referenced by transactional writes within a first transaction with a first plurality of tentative write values during execution of the first transaction as part of a first software thread utilizing an update-in-place software transactional memory (STM) system; and buffering a second plurality of tentative write values to be committed to a second plurality of memory locations referenced by transactional writes within a second transaction during execution of the second transaction as part of a second software thread utilizing a write-buffering STM system, wherein execution of the second transaction is at least partially in parallel with the execution of the first transaction.

13. The machine accessible storage medium of claim 12, wherein the first software thread includes a main software thread of an application and the second software thread includes a helper software thread of an application, and wherein execution of the first transaction includes non-speculative execution of the first transaction and execution of the second transaction includes speculative execution of the second transaction.

14. The machine accessible storage medium of claim 12, wherein the program code which, when executed by the machine, further causes the machine to perform the operations of:

copying the second plurality of tentative write values to the second plurality of memory locations in response to committing the second transaction, and discarding the second plurality of tentative write values in response to an abort of the second transaction.

15. The machine accessible storage medium of claim 12, wherein the program code which, when executed by the machine, further causes the machine to perform the operations of:

restoring a first plurality of logged, previous values from a write log to the first plurality of memory locations in response to aborting the first transaction, and discarding the first plurality of logged, previous values from the write log in response to committing the first transaction.

\* \* \* \* \*